United States Patent Office 2,697,683
Patented Dec. 21, 1954

2,697,683

TREATMENT OF HYDROCARBON OILS

Willem Frederik Engel and Han Hoog, Amsterdam, Netherlands, assignors to Shell Development Company, Emeryville, Calif., a corporation of Delaware No Drawing. Application February 23, 1951,
Serial No. 212,528

Claims priority, application Netherlands
February 27, 1950

3 Claims. (Cl. 196—28)

This invention relates to an improved method for the treatment of sulfur-bearing hydrocarbon oils. It is particularly advantageous for the treatment of sulfur-bearing oils of an unsaturated nature such, in particular, as shale oil and the unsaturated products of the thermal or catalytic cracking of hydrocarbon oils.

According to the invention, the sulfur-containing oil is treated with hydrogen under special conditions with novel and superior promoted molybdenum oxide catalyst.

It is well known to treat sulfur-bearing hydrocarbon oils with hydrogen and a sulfactive hydrogenation catalyst. In the known processes several reactions take place to greater or lesser extents, depending upon the oil, the particular catalyst, and the conditions. The main reactions encountered are cracking of hydrocarbon molecules with saturation of the cracked fragments, hydrogenation of aromatic hydrocarbons to naphthenes, hydrogenation of olefins and other unsaturated compounds, and hydrogenation of sulfur compounds with the production of hydrocarbons and hydrogen sulfide. Under some conditions, some dehydrogenation of naphthenic hydrocarbons may take place and, if oxygen and nitrogen compounds are present in the oil, these may also be hydrogenated to some extent. These reactions not only result in more or less profound changes in the nature of the oil but also use up large amounts of costly hydrogen, e. g., 900 cubic feet/barrel of oil.

It would be highly desirable to be able to treat various hydrocarbon oils selectively, i. e., to effect one or two of the desired reactions to the substantial exclusion of others. Some attempts have been made to provide a more selective process and some measure of success has been achieved, but a truly selective action has so far not been obtained. The desirability of a selective process exists for the treatment of hydrocarbon oils of various characteristics. A selective process is, however, particularly desirable for the treatment of oils of an unsaturated nature. In treating unsaturated oils such as cracked gasoline, for example, under conditions to effect substantial removal of the sulfur, an appreciable hydrogenation of the unsaturated hydrocarbons invariably takes place in even the best of the hitherto known processes. This is quite undesirable as it not only greatly increases the consumption of hydrogen but also degrades the anti-knock characteristics of the oil. In order to lessen this difficulty, it is the practice to effect only a very mild and incomplete desulfurization of such oils.

The most active of the hitherto known sulfactive catalysts for the desulfurization of hydrocarbon oils and the catalyst used commercially for the desulfurization of cracked gasoline is a tungsten-sulfide nickel-sulfide catalyst. This catalyst is described in U. S. Patent No. 2,528,693. The catalyst is very active and has a long life. It has the disadvantages, however, of being quite costly and not as selective as would be desired.

Another more recently developed catalyst is cobalt molybdate with a synthetic alumina carrier. This catalyst is less costly and quite rugged, but also of much lower activity. This catalyst and its use are described in Industrial Engineering Chemistry 35, pages 1160–1167 (1943); and in Transactions of the American Institute of Chemical Engineers, 43, No. 1, pages 1–12 (1947). It is said that the preferred catalyst is prepared by precipitating cobalt molybdate in undried alumina gel. About 20% cobalt molybdate is required to give the maximum activity. The developers of this catalyst have shown that the catalytic action is due to cobalt molybdate; thus, neither cobalt oxide nor molybdenum oxide or a mixture thereof afforded an activity comparable with that of the cobalt molybdate compound. It has now been found that the process may be carried out more efficiently, more selectively, and more economically with an impregnated type molybdenum oxide catalyst promoted with a small amount of cobalt and preferably also with a small amount of potassium. When the catalyst is prepared by impregnating a suitable carrier with the molybdenum and promoter, it is found that a higher activity is obtained than when incorporating the same amount of metals by precipitation. Consequently, active catalysts can be prepared with lesser amounts of the costly metals. Also, it is found that when preparing the catalyst by impregnation of a suitable carrier, it is entirely unnecessary to prepare a wet synthetic alumina gel, since a catalyst of equal or superior properties can be prepared from an inexpensive bauxite base. This is disclosed in our copending application, Serial Number 82,285, filed March 18, 1949, now abandoned, of which this application is a continuation-in-part. Also, it has been found that when preparing the catalyst by impregnation of bauxite or synthetic alumina with the metals, catalysts of greatest activity are obtained when the cobalt is applied only in a very small amount rather than as cobalt molybdate. It has also been found that the catalyst is greatly improved in selectivity if it is also promoted with a small amount of potassium and subjected to a final drastic thermal treatment in the presence of oxygen.

The catalyst may be prepared with any of the conventional carrier materials. However, carriers consisting essentially of alumina give catalysts which are far superior for this specific purpose to those prepared with any of the other materials tried, including such materials as Terrana, fuller's earth, silica gel, TCC cracking catalyst. This is illustrated in the following table wherein there are shown the percentages of desulfurization of a given oil under a given set of conditions with catalysts of the same composition except for the carrier material used. The composition in parts by weight was in each case 100 parts carrier, 6.5 parts molybdenum, and 0.8 part cobalt.

| Carrier | Percent Desulfurization |
|---|---|
| Aloxite | 50.0 |
| TCC Cracking Catalyst | 63.1 |
| Silica Gel | 20.0 |
| HCl treated fuller's earth | 33.9 |
| HF treated Terrana | 67.0 |
| Bauxite | 82.3 |
| Synthetic alumina | 78.1 |

It will be seen that the bauxite and synthetic alumina (Hydras aluminicus T–798 supplied by Remmert-Holland) are far superior to any of the other materials.

While very active catalyst can be made using synthetic alumina as the carrier, the preferred carrier is bauxite. Various bauxites have been tried with substantially equivalent results. Analyses of typical suitable bauxites are given in the following table:

| | (1) | (2) | (3) |
|---|---|---|---|
| $Al_2O_3$ | 85.2 | 59.7 | 61.7 |
| $SiO_2$ | 5.5 | 5.6 | 3.7 |
| $Fe_2O_3$ | 3.3 | 2.2 | 0.8 |
| $TiO_2$ | 4.0 | 1.7 | 1.7 |
| Loss in Ignition | 2.0 | 30.8 | 32.1 |

In order to investigate the possibility of improving bauxites as well as other materials as bases in the catalyst, various carrier materials were subjected to numerous pretreatments with acids, heating, washing, and combinations thereof. The effect of pretreatment with various acids is shown in the following table wherein there are shown the percentages of desulfurization of a given oil under a given set of conditions with catalysts of a given composition prepared with an alumina carrier which was pretreated with the various acids listed. The composition in parts by weight was, in each case, 100 parts carrier, 6.5 parts molybdenum, and 0.8 parts cobalt.

| Pretreating Agent | Percent Desulfurization |
| --- | --- |
| None | 84.1 |
| 5% Al(NO₃)₃ at 20° C | 83.3 |
| 5% H₂SO₄ at 90° C | 84.1 |
| 10% Sulfamic acid at 20° C | 80.5 |
| Acetic acid at 90° C | 84.1 |
| 5 N HF at 20° C | 66.4 |
| 5 N H₃PO₄ at 90° C | 65.7 |

No pretreatment with any of these acids, or any combination thereof with heating, washing, etc., gave any appreciable improvement. It was found, however, that the carrier could be appreciably improved for the purpose by a quite drastic treatment with hydrochloric acid. It was found that, in order to obtain the desired improvement, it is necessary to use fairly strong acid, e. g., at least 2 N HCl, at a fairly high temperature and to continue the treatment for several hours. Treatment of the carrier with 5 N HCl for 16 hours at 90° C. is recommended. After this treatment, the carrier is washed until substantially free of chlorine, dried at about 110° C., and finally calcined at about 500° C. to reduce the water content to preferably between about 3 and 5%. The improvement afforded by this pretreatment is illustrated in the following table wherein the percentages desulfurization of a given oil under a given set of test conditions are shown for catalysts made with five different aluminous carriers with and without the described pretreatment. The catalysts were each prepared in the same manner and had the following composition in parts by weight, 100 parts carrier, 6.5 parts molybdenum, 0.8 parts cobalt.

| Carrier | Carrier Not Pretreated | Carrier Pretreated |
| --- | --- | --- |
| 1 | 80.0 | 85.7 |
| 2 | 82.3 | 88.6 |
| 3 | 78.1 | 84.4 |
| 4 | 84.1 | 88.8 |
| 5 | 84.1 | 88.6 |

The reason for the effectiveness of the described pretreatment is not known. It is, however, apparently not due to the removal of sodium normally present in small amounts since equivalent removal of sodium by other pretreatments, e. g., the described treatment with 5% Al(NO₃)₃, gave no improvement.

The described pretreatment of the carrier is inconvenient in the technical scale and increases the cost of the catalyst. It was found that this complication could be avoided while still producing highly active catalyst of good physical properties, provided that one starts with a carrier in which the alumina is completely hydrated. If bauxite containing at least about 30% water, or a synthetic alumina trihydrate is used as the starting material, an excellent catalyst can be made by the following method. The undehydrated material is powdered and the powder is mixed with an amount of a solution of aluminum chloride or aluminum sulfate to incorporate between about 2 and 6 parts of the aluminum salt and to produce a paste. Pellets are formed from the mixture by pilling or by extrusion, and the pellets are then calcined while raising the temperature slowly to 400–800° C. During the calcination, the added aluminum salt apparently reacts with liberated water of hydration forming oxy salts. This method is more fully described in application, Serial Number 198,021, filed November 28, 1950, now U. S. Patent 2,662,860.

When preparing the catalyst through this last procedure, the molybdenum and promoters are incorporated in the calcined carrier pellets. When preparing the catalyst through the procedure involving the drastic HCl treatment, it is essential to incorporate the molybdenum and promoters prior to pelleting. Thus, according to this procedure, the pretreated carrier is impregnated with suitable salts of the promoters and the mixture is then formed into pellets. Only after the pellets have been formed is the material heated to a point to decompose the metal salts.

While the described carrier is the predominating constituent of the catalyst and has of itself no hydrogenation activity, its careful preparation is essential to the production of the catalyst affording the desired activity in the treatment of sulfur-bearing hydrocarbon oils. The carrier, when properly prepared, exerts a synergistic effect with the other catalyst components.

The next largest component of the catalyst is molybdenum oxide, or more properly, a molybdenum oxysulfide. The catalyst is prepared in the oxide form but is preferably partially sulfided prior to use. The sulfiding of the catalyst may be effected through actual use, provided that an oil having a fairly high concentration of sulfur is treated under rather mild conditions. In some cases, however, the use of the unsulfided catalyst leads to a rapid and violent reaction which quickly fouls the catalyst.

The molybdenum is incorporated with the carrier by impregnating the carrier with a solution of a soluble molybdenum salt. The preferred salt is ammonium molybdate but other salts may be applied. Upon subsequent calcination, the applied salt is decomposed to molybdenum oxide. When incorporating the molybdenum in this manner, rather than by precipitation, the activity of the catalyst increases rapidly with increasing concentrations of molybdenum up to about 4% molybdenum. Between about 4% molybdenum and about 8% molybdenum, the activity increases only moderately, and above 8% molybdenum there is no appreciable increase in activity. Thus, when preparing the catalyst in the described manner, the optimum activity is attained at a lower concentration, compared to a catalyst prepared by precipitation methods. The concentration of molybdenum in the catalyst is, therefore, adjusted to be between 4% and 8% and preferably about 6%.

The next largest component of the catalyst is cobalt. As previously pointed out, the optimum activity of the multicomponent catalyst when prepared in the described manner is obtained when the cobalt is applied in a relatively small critical amount, and not as cobalt molybdate. Thus, the optimum amount of cobalt is only about 12% of the amount of molybdenum. The effect of this ratio is illustrated in the following table wherein the activities of comparable catalysts having different amounts of cobalt are shown. In each case, the catalyst contained a fixed amount of molybdenum, namely 6.5 parts per 100 parts of pretreated bauxite carrier, and the same process conditions were applied.

| Parts Co/6.5 Parts Mo | Percent Desulfurization |
| --- | --- |
| 0 | 55.2 |
| 0.4 | 83.3 |
| 0.8 | 88.8 |
| 4.0 ¹ | 78.9 |

¹ Corresponds to the ratio in cobalt molybdate.

It is seen that when combining by impregnation 0.8 parts by weight of cobalt with 6.5 parts by weight of molybdenum in the carrier, the activity was much superior to that when the cobalt and molybdenum were used in the ratio corresponding to cobalt molybdate, notwithstanding the fact that the catalyst contained only ⅕ as much valuable cobalt and only ⁷⁄₁₀ as much total metal promoter.

This difference is not only shown in desulfurization activity but is also shown in general hydrogenation activity. Thus, a catalyst promoted with 12% cobalt (based on the molybdenum) was found to be 125% as active as one containing 1.4 times as much total metals in the ratio corresponding to that of the compound cobalt molybdate.

The cobalt is incorporated in the catalyst by impregnating the carrier with a solution of a soluble cobalt salt, e. g., cobalt nitrate. This may conveniently be done simultaneously with the incorporation of the molybdenum. Thus, solutions of ammonium molybdate and cobalt nitrate may be mixed and the bauxite or alumina impregnated with the mixture. After the impregnation the material is dried and then calcined at about 350–500° C. to convert the metal salts to the oxides.

Various hydrocarbon oils, including very heavy and waxy oils, may be treated with the catalyst prepared as described. Even when operating under relatively severe conditions, there will be no appreciable hydrogenation of the aromatic constituents of the oil. When treating a hydrocarbon oil of unsaturated nature, i. e., an oil having a bromine number of at least 10, some saturation of the olefins or other unsaturated compounds occurs. This saturation can be minimized to some extent by choosing mild treating conditions, but the extent of saturation is, nevertheless, appreciable and higher than would be desired. It is found, however, that the catalyst may be made exceptionally selective also with regard to unsaturated constituents by the incorporation of a second promoter and by subjecting the catalyst prior to use to a special drastic heat treatment in the presence of oxygen. Each of these expedients, it is found, increases the selectivity with respect to unsaturated aliphatic constituents of the oil but, their combination results in a catalyst which is so selective that a deep desulfurization may be effected without even appreciably affecting diolefins. When treating saturated oils such as virgin gas oils, straight run gasolines, and the like, this improved selectivity is of little value. When treating unsaturated oils such as various oils produced by cracking or thermal reforming treatments on the other hand, the further improved selectivity is very important.

The second promoter applied in the preferred more selective catalyst is a salt of potassium. The preferred potassium salts are potassium chloride, potassium nitrate, potassium carbonate and potassium bicarbonate. However, other water soluble potassium salts having a non-metal anion can be used. The potassium salt may be incorporated in the catalyst by any suitable method. Impregnation of the catalyst with an aqueous solution of the salt followed by drying is recommended. The potassium salt is incorporated in the catalyst in such an amount that the per cent by weight of potassium is between 2.5% and 25%, and preferably about 6%, based on the weight of molybdenum.

After drying the green catalyst and calcining, e. g., at 500° C. to convert the molybdenum and cobalt compounds to the oxides, the catalyst is finally subjected to a drastic heat treatment in the presence of oxygen. Thus, the catalyst is calcined at a temperature from about 700° C. up to about 800° C. for from 2 to about 40 hours. This final treatment is of importance and must be carefully carried out under proper conditions. The treatment must be carried out in the presence of oxygen; no change in the selectivity of the catalyst was observed when completely oxygen-free nitrogen was used. When treating the catalyst in air at 700° C., the desired effect was not produced in 10 hours. When treating the catalyst in air at 800° C. for 10 hours, the desired selectivity was obtained but the activity was greatly reduced. The maximum improvement is attained by treating the catalyst at about 750° C. for about 10 hours. Temperatures from about 700° C. to 800° C. may be suitably applied, however, provided that the time is suitably lengthened when the temperature is below 750° C. and suitably shortened when the temperature is above 750° C.

While it is not essential, it is preferred to pretreat the catalyst prior to use to partially sulfide it. This may be done by using the catalyst to treat an oil of high sulfur content under lower-than-optimum temperatures. Thus, the catalyst may be placed in a reactor and used to treat a sulfur-bearing oil under normal conditions except for the temperature which is preferably about 50–100° C. lower than that applied in normal operation. The presulfiding of the catalyst may be done most effectively by treating the catalyst with a mixture of hydrogen and hydrogen sulfide. Hydrogen sulfide alone can be used but is not recommended since its use leads to oversulfiding if the treatment is not carefully controlled.

Example I

Synthetic alumina in the form of 3–5 mm. granules which had been activated by partial dehydration was calcined for 2 hours at 500° C. The granules were then treated with a 15% solution of hydrochloric acid at about 100° C. for 16 hours. After washing and drying, the alumina was again dehydrated to a water content of 3.5% by calcining for 3 hours at 500° C. The granules were then impregnated with a solution of ammonium molybdate and cobalt nitrate in an amount to give a composite containing 6.5 parts molybdenum and 0.8 part cobalt per 100 parts by weight of alumina. The granules were then ground to pass a 45 mesh sieve, and the powder was pelleted with 1% graphite into 3 x 5 mm. cylinders. The pellets were then heated at 370° C. for 2 hours to convert the molybdenum and cobalt compounds to the oxides.

This example illustrates the preferred method for preparing the catalyst from partially dehydrated carriers such as so-called activated alumina and partially dehydrated bauxite.

Example II

An undehydrated bauxite containing about 35% water was ground to powder. The powder was mixed with a 16% solution of aluminum chloride in an amount to introduce 4.2% aluminum chloride based on the bauxite. The mixture was kneaded to a paste which was then extruded into 6 mm. strands which were cut into cylindrical pellets. The pellets were air dried for one day at room temperature and then further dried by gradually heating to 120° C. and maintaining the temperature for an additional 8 hours. The dried pellets were then calcined by gradually heating to 500° C. during 8 hours and maintaining the temperature for an additional 2 hours. The calcined pellets were then impregnated with ammonium molybdate and cobalt nitrate in such amounts that the finished catalyst contained by weight 100 parts bauxite, 6.5 molybdenum, and 0.8 parts cobalt. The pellets were then dried at 120° C. and finally heated to 370° C. in a stream of nitrogen for 2 hours to convert the ammonium molybdate and cobalt nitrate to the corresponding oxides.

Example III

Undehydrated Surinam bauxite containing 35% water was pulverized and the powder was kneaded with such an amount of an aqueous solution of aluminum sulfate that the resulting paste contained 3.4% by weight of aluminum sulfide, based on the quantity of bauxite. The paste was extruded into strands of 6 mm. diameter which were subsequently cut to form 6 x 8 mm. cylindrical pellets. After drying at 20° C. for 8 hours and at 120° C. for 8 hours, the pellets were finally heated to 500° C. in the course of 2 hours and maintained at that temperature for an additional 2 hours. The pellets were then impregnated with the same amounts of molybdenum and cobalt as in the above Example II.

Examples II and III illustrate the method of preparing a satisfactory catalyst which, as stated above, not only produces a highly active catalyst, but is more economical than the method illustrated in Example I.

The catalyst prepared as described not only has a high activity but it is much more selective than the mentioned tungsten-sulfide nickel-sulfide catalyst currently in use. Thus it is capable of hydrogenating sulfur compounds almost completely without hydrogenating aromatic hydrocarbons. It has the additional advantage that it is a very rugged catalyst, is more easily regenerated, and is much less costly. It is suited for the treatment of a wide variety of sulfur-bearing hydrocarbon oils. Various oils including heavy waxy distillates have been successfully treated. Oils have been treated over thousands of hours without regeneration of the catalyst and with no appreciable decline in the efficiency of the process.

The conditions to be applied in the process of the invention depend somewhat upon the hydrocarbon oil to be treated and the extent of treatment desired. For economic reasons, it will generally not be desired to effect more than a nominal desulfurization of a waxy distillate or a crude shale oil which is to be used as a feed for catalytic cracking. When treating such a stock relatively mild conditions will, therefore, be chosen. Suitable treating temperatures are between about 350° C. and about 490° C. When treating oils of an unsaturated nature, the optimum temperature is appreciably higher. The optimum temperature will depend upon the particular oil treated but will in general be about 25° C. higher than when treating such oils with less selective catalysts. The optimum temperatures for treating unsaturated gasolines with the preferred selective catalyst are, for example, between about 425° C. and 460° C. For the treating of shale oil, the optimum temperature is between about 450° C. and 500° C. Temperatures somewhat above or below the optimum can be used with decreased efficiency if desired.

The process is preferably carried out under a substantial pressure. Thus, it is preferred to employ a pressure of at least 10 atmospheres. There is no upper limit to the applicable pressure except that imposed by limitations of equipment.

The hydrocarbon oil may be contacted with the catalyst in any of the conventional manners. When treating light distillates such as gasoline or naphtha, it is preferred to pass the oil vapors through a bed of the catalyst in the conventional way. When treating shale oil, or other such heavy oils, it is preferred to contact the oil with the catalyst in the following different and particular manner. A fixed bed of the catalyst having a vertical length at least 6 times the diameter is used. The pressure is maintained quite high, e. g., 50–200 atmospheres to prevent more than 20% vaporization of the oil and the oil in liquid form is allowed to trickle down through the catalyst bed along with a restricted concurrent flow of hydrogen.

The process of the invention is always carried out in the presence of hydrogen or a gas containing or yielding considerable amounts of hydrogen. When contacting the oil with the catalyst in the conventional vapor phase manner, hydrogen is preferably applied in an amount of at least 3000 cubic feet/barrel, e. g., 7,000 cubic feet per barrel. When contacting heavy oils by the above-described method much smaller amounts of hydrogen may be used. In this case, the amount of hydrogen recycled may be reduced to a very low value, e. g., 480 cubic feet/barrel and, in some cases, even 100 cubic feet per barrel, without causing the activity of the catalyst to drop rapidly. This is due partly to the nature of the catalyst, and partly to the particular method of contacting the oil and hydrogen with the catalyst.

The contact time depends, in any case, upon the particular oil and upon the chosen pressure and temperature, and is adjusted to afford the desired degree of treatment which, as pointed out above, will depend largely upon the ultimate use for which the oil is intended.

*Example IV*

Gas oils having the following properties were treated with a catalyst prepared as described in Example I.

| Feed | I | II |
|---|---|---|
| d 20/4 | 0.8457 | 0.8466 |
| Aniline Point, °C | 73 | 72.2 |
| Sulfur percent wt | 1.26 | 1.20 |
| Initial Boiling Point, ASTM, °C | 245 | 260 |
| Final Boiling Point, ASTM, °C | 358 | 347 |

The oils were treated under the following conditions. Temperature 375° C.; pressure 50 atmospheres; liquid hourly space velocity (L. H. S. V.) 2.4–3.6; recycle gas rate 250 l./kg.; the oil was passed downwardly with the recycled hydogen gas through a bed of the catalyst in the preferred manner described above. For the first 130 hours of operation, the liquid hourly space velocity was 2.4 during which time the oil was 88% desulfurized.

The liquid hourly space velocity was then increased to 3.6 and the process was continued without regeneration up to 300 hours during which time the desulfurization remained constant at 80%. The original space velocity was again established and the process was continued; after 407 hours of continuous processing the recycle gas rate was reduced to 125 l./kg. During this period of 403 to 630 hours, the oil was 89% desulfurized. The recycle gas rate was further reduced to 60 l./kg. This resulted in a slight loss in efficiency (83% desulfurization), but did not result in deactivation of the catalyst since, upon returning to the original condition, the desulfurization after a total of 920 hours was still 86%.

*Example V*

Three different gas oils having properties very similar to those shown in Example IV were treated under the following conditions. Temperature 375° C.; pressure 50 atmospheres; liquid hourly space velocity 2.4; recycle gas rate 50 l./kg. with a catalyst prepared as described in Example I. The oil was contacted in the liquid phase with the catalyst by the preferred method described above. During the first 235 hours of operation the average desulfurization was 77% after which it leveled off to a constant value of 80%. After 574 hours of continuous operation, the rate of recycle of hydrogen gas was increased to 125 l./kg. After 1170 hours of operation the gas recycle rate was set at 60 l./kg., and the process was continued with 83% desulfurization. The catalyst at this point was found to have a carbon content of 1.8%.

*Example VI*

The catalyst used in Example V, after being in operation for 1259 hours without regeneration, was used for desulfurization of a black flashed distillate having the following properties:

| | |
|---|---|
| d 20/4 | 0.901 |
| Aniline point °C | 80.5 |
| Sulfur percent/wt | 2.45 |
| Conradson carbon | 0.24 |

The oil was contacted with the catalyst in the described preferred manner under the following conditions:

| | |
|---|---|
| Temperature °C | 375 |
| Pressure atm | 50 |
| L. H. S. V | 1.1 |
| Recycle gas rate l./kg | 250 |

At 1260 and 1534 processing hours the desulfurization was 79% and 80% respectively with no sign of catalyst deactivation. The Conradson carbon was reduced to .010%.

*Example VII*

A black flashed distillate having the properties of that shown in Example VI was treated in the described preferred manner using a catalyst prepared as described in Example I. The oil was treated under the following conditions:

| | |
|---|---|
| Temperature °C | 375 |
| Pressure atm | 50 |
| L. H. S. V | 1.11 |
| Recycle gas rate l./kg | 125 |

Under these conditions the desulfurization was constant at 76% and the Conradson carbon was reduced to 0.10%.

Following several hundred hours of operation, the process was continued for the treatment of a waxy oil having the following properties:

| | |
|---|---|
| d50/4 °C | 0.899 |
| Aniline point °C | 80.0 |
| Sulfur percent/wt | 2.68 |
| Conradson carbon | 0.46 |
| Distillation residue percent | 0.80 |

The recycle gas rate was increased to 250 l./kg. The desulfurization remained constant at 72%.

At the completion of this run, the catalyst had been used for over 2000 hours without regeneration. At this point, the catalyst was removed from the reactor and examined. The catalyst was found to have a carbon content of about 4% and apart from a slight quantity of "fines," it appeared satisfactory. The catalyst was then recharged to the reactor without regenerating it and the process was continued for the treatment of a gas oil containing about 1.25% sulfur. In spite of a high liquid hourly space velocity (2.4) and a very low recycle gas rate (50 l./kg.), the desulfurization was constant at 88%.

*Example VIII*

A moderately heavy gas oil boiling between 260° C. and 350° C. and containing 1.33% sulfur was treated in the described preferred manner with a catalyst prepared as described in Example I. The oil was treated at 375° C. and 50 atmospheres pressure. The oil feed rate was 2 kg./l./hr. The gas recycle rate was fixed at 150 l./kg. of feed. When recycling relatively pure hydrogen, the desulfurization was 90% complete. When under the same conditions a gas consisting essentially of 40% hydrogen and 60% methane was used, the desulfurization was 85% complete. When, under the same conditions, a gas consisting essentially of 40% hydrogen and 60% nitrogen was used, the desulfurization was likewise 85% complete.

*Example IX*

A Middle East gas oil which boiled between 260° C. and 350° C. and had a sulfur content of 1.27% was treated with a catalyst prepared as described in Example II. The treatment was carried in the vapor phase at a rate of 3 kilograms of oil per liter of catalyst per hour at 375° C. The pressure was 50 kg./cm.$^2$ and hydrogen was applied at the rate of 1500 liters per kilogram of the oil. Under these conditions, the oil was 90–92% desulfurized.

When the same oil was treated under the same conditions with a catalyst prepared as in Example I the oil was 83–85% desulfurized.

When the same oil was treated under the same conditions with a catalyst prepared as in Example III the oil was 88-89% desulfurized.

Example X

Previously activated bauxite, in the form of 3-5 mm. granules was glowed for two hours at 500° C. and then treated for 16 hours at 90° C. with a 15% aqueous solution of hydrochloric acid. After washing the granules with water, and again glowing them for three hours at 500° C., they were impregnated with such a quantity of a solution of ammonium molybdate and cobalt nitrate, and with and without potassium nitrate, that the whole of the solution was absorbed by the bauxite. The amounts employed were such that the catalyst contained 100 parts by weight bauxite; 6.5 parts by weight Mo; 0.8 parts by weight Co; and 0 and 0.4 parts by weight K. After drying the impregnated bauxite at 100° C., it was pulverized and formed into pellets with the aid of 1% graphite. The catalysts with and without the potassium were heated for two hours in a stream of nitrogen at 370° C. to convert the cobalt and molybdenum salts to the oxides. Portions of the catalyst were then heated in air for 10 hours at temperatures of 650° C. and 750° C. The portions were used to treat a sulfur-bearing cracked gasoline under the following conditions. Temperature 400° C.; pressure 10 atmospheres; hydrogen, 2 moles per mole of gasoline. The gasoline feed had the following properties. Boiling range 120° C.-220° C.; sulfur content 0.19%; Bromine No. 20; maleic anhydride value 6. After breaking in the catalysts by the above treatment, they were employed for the treatment of the same gasoline at 450° C. The other conditions were the same but the through-put rate was adjusted in each case to obtain 50% desulfurization and 80% desulfurization. The products were analyzed to determine the percentages of unsaturated hydrocarbons hydrogenated under these conditions.

The results are shown in the following table:

| Catalyst | Percent of Unsaturated Hydrocarbons Hydrogenated at 50% and 80% Desulfurization | |
|---|---|---|
| | 50% Desulfurization | 80% Desulfurization |
| 1. Molybdena/bauxite + Co promoter | 20 | 51 |
| 2. Molybdena/bauxite + Co + K promoter | 17 | 48 |
| 3. Catalyst No. 2 after heating 10 hours at 650° C | 20 | 50 |
| 4. Catalyst No. 2 after heating 10 hours at 750° C | 6 | 29 |

When treating unsaturated oils with any catalyst under conditions chosen to give more or less selective desulfurization, the catalyst gradually loses activity with time. The absolute rate of decline of the activity depends upon the temperature, upon the hydrogen pressure, and upon the oil being treated. When treating unsaturated oils with the described new catalyst and under the described conditions, the rate of loss of activity is low even when employing the preferred high temperatures. This is illustrated in the following example where the rates of loss of activity under different temperature conditions are shown.

Example XI

Catalysts of the same composition as shown in Example X were used to treat a cracked gasoline at 400° C., 425° C., and 450° C. The space velocity was adjusted in each case to give 78% desulfurization, the other conditions remaining the same. The decline in the percentage desulfurization after 30 hours of processing was determined to be as follows:

| Temperature, ° C. | Drop in Percent Desulfurization |
|---|---|
| 400 | 0 |
| 425 | 0 |
| 450 | 3 |

After a period of use, the activity of the catalyst may be restored to its original activity by burning the carbonaceous deposits in the conventional manner. One suitable set of conditions is, for example, temperature 550° C.; pressure 1 atmosphere; oxygen concentration in regeneration gas 4%; gaseous hourly space velocity 500.

Example XII

A catalyst having the following composition was prepared as described in Example X. Bauxite 100 parts; molybdenum 6.5 parts; cobalt 0.8 parts; potassium 0.4 parts. The final thermal treatment was effected at 750° C. in air for 10 hours. The catalyst was used for the treatment of a catalytically cracked gasoline under the following conditions. Temperature 475° C.; pressure 10 atmospheres; $H_2$/gasoline mole ratio 2:1; weight hourly space velocity 1. The properties of the feed and the product are shown in the following table:

| | Feed | Product |
|---|---|---|
| Percent Sulfur | 0.19 | 0.08 |
| Bromine Number | 20 | 18.8 |
| Octane No. Motor Method | 76 | 77 |
| Yield Percent/wt | | 97.5 |

The superior selectivity of action obtained by the described process is most clearly evident from so-called selectivity curves obtained by plotting the monoolefin retentions at various degrees of desulfurization. Such curves were determined for the catalyst prepared as described, as well as for standard catalyst. The coordinates shown in the following table show the relative positions of the curves:

| Percent Desulfurization | Monoolefin Retention | | |
|---|---|---|---|
| | No. 1 | No. 2 | No. 3 |
| 40 | 97 | 87 | 80 |
| 50 | 91 | 80 | 75 |
| 60 | 85 | 72 | 68 |
| 70 | 78 | 62 | 60 |
| 80 | 72 | 51 | 47 |

Catalyst No. 1 was a bauxite-molybdenum catalyst promoted with cobalt and potassium, the ingredients being present in the weight ratios of 100:6.5:0.8:0.4. The catalyst was prepared by impregnation as described in Example X and thermally treated for 10 hours at 750° C. in air.

Catalyst No. 2 was exactly like catalyst No. 1 except that the potassium promoter and the final thermal treatment were omitted.

Catalyst No. 3 was the commercial tungsten-sulfide nickel-sulfide catalyst. It is one of the most active and selective of the previously known catalysts and is used in commercial practice for the selective desulfurization of catalytically cracked gasoline.

Catalyst Nos. 1 and 2 were used under the following approximately optimum treating conditions. Temperature 450° C.; pressure 10 atmospheres; hydrogen/hydrocarbon mole ratio 2; space velocity variable.

These conditions are not suitable for catalyst No. 3 and, consequently, this catalyst was used under conditions optimum for it, namely; temperature 315° C.; pressure 5.3 atmospheres; hydrogen/hydrocarbon mole ratio 2; space velocity variable.

It will be seen that catalyst No. 2 is appreciably more selective than catalyst No. 3, and that catalyst No. 1 is appreciably more selective than catalyst No. 2.

Example XIII

A catalytically cracked gasoline was treated under the following conditions:

Temperature _____ 465° C.
Pressure _____ 20 atm.
L. H. S. V _____ 4 kg./l. catalyst/hr.
Hydrogen rate _____ 4 moles/l. catalyst/hr.

with a catalyst which had been prepared as described in Example X and had been used for 552 hours. During a 138 hour test period, the results were as follows:

|  | Feed | Product |
|---|---|---|
| Boiling Range, °C | 120–220 | 120–220 |
| Sulfur, Percent wt | 0.39 | 0.19 |
| Bromine No | 26.2 | 23.1 |
| ASTM Octane No., Clear | 84.0 | 83.8 |
| ASTM Octane No.+3 cc. TEL | 86.8 | 87.4 |
| Yield, Percent Vol |  | 99 |

The process of the invention is particularly advantageous for the treating of shale oil, i. e., the crude oil obtained by the thermal-decomposition of oil shale. Such oil is unsaturated and contains large amounts of sulfur compounds and waxy constituents. Shale oil has been treated in a mixture with relatively large amounts of other oils under destructive hydrogenation conditions with fair success. However, shale oil by itself has presented a most difficult refining problem. When shale oil is treated with the prior-known catalysts under conventional conditions, a satisfactory gasoline fraction can be obtained, but the residue is so waxy as to make its use for fuel oil undesirable. When treating shale oil according to the process of the present invention, not only is a satisfactory gasoline of very low sulfur content obtained, but the higher boiling part of the crude shale oil is much superior. The treatment of shale oil by the method of the invention is illustrated in the following example.

*Example XIV*

Shale oil produced from Colorado oil shale was treated with a catalyst prepared as described in Example I. The treatment was carried out in the described preferred manner under the following conditions:

Temperature _____ 475° C.
Pressure _____ 150 atm.
L. H. S. V _____ 8.49 kg./l./hr.
Hydrogen rate _____ 240 l./kg. oil.

The properties of the feed and the product were as follows:

|  | Feed | Product |
|---|---|---|
| d 50/4 | 0.902 | 0.796 |
| Pour Point, °C | 32 | 20 |
| Conradson Carbon | 3.3 | 0.02 |
| Elementary Analysis, percent wt.: |  |  |
| C | 84.37 |  |
| H | 11.62 |  |
| S | 0.81 | 0.05 |
| N | 2.00 | 0.32 |
| O | 1.20 |  |
| Yield, percent wt |  | 93 |

Upon distillation the product yielded:

26% heavy sulfur-free gasoline.
51% diesel oil of 0.01% S and 52 diesel index.
23% heavy oil of 0.17% S and 0.5 Conradson carbon.

The heavy oil was not waxy and was suitable for use in fuel oil.

When treating the shale oil under otherwise the same conditions, but at a temperature of 450° C. and 50 atmospheres pressure, the yield was 97.5% by weight; 80% of the sulfur and oxygen, and 25% of the nitrogen were removed; the density at 50/4 was 0.854; the lighter products boiling below 371° C. were increased from 33% to 70.5% by volume.

We claim as our invention:

1. The process for treating a sulfur-bearing hydrocarbon oil which comprises contacting a sulfur-bearing hydrocarbon oil of unsaturated nature under hydrogenation conditions at a pressure of at least 10 atmospheres and at a temperature between 425° C. and 500° C. and in the presence of an added gas consisting largely of hydrogen with an impregnated type molybdenum oxide catalyst consisting essentially of an alumina carrier containing between 4% and 8% molybdenum and promoted with about 12% cobalt and between about 2.5% and 25% of potassium both based on the molybdenum, said catalyst having been calcined in the presence of oxygen and at a temperature of about 750° C. for about 10 hours prior to use.

2. The process for treating a sulfur-bearing hydrocarbon oil which comprises contacting an unsaturated sulfur-bearing hydrocarbon oil of the nature of gasoline in the vapor phase under hydrogenation conditions at a pressure of at least 10 atmospheres and at a temperature between 425° C. and 460° C. in the presence of at least 3000 cubic feet of hydrogen per barrel of oil with an impregnated type molybdenum oxide type catalyst consisting essentially of an alumina carrier containing between 4% and 8% molybdenum and promoted with about 12% cobalt and between about 2.5% and 25% of potassium both based on the molybdenum, said catalyst having been calcined in the presence of oxygen and at a temperature of about 750° C. for about 10 hours prior to use.

3. A process for treating sulfur-bearing hydrocarbon oils which comprises contacting a sulfur-bearing hydrocarbon oil of unsaturated nature under hydrogenation conditions at a pressure of at least 10 atmospheres and at a temperature between 350° C. and 500° C. in the presence of an added gas consisting largely of hydrogen with an impregnated type molybdenum oxide catalyst consisting essentially of an alumina carrier which catalyst has been treated with a strong inorganic acid for at least 16 hours at a temperature of about 90° C. and impregnated with from 4 to 8% molybdenum and about 12% cobalt and between about 2.5 and 25% of potassium each based on the molybdenum, said catalyst having been calcined in the presence of oxygen at a temperature of from about 700° C. to about 800° C. for a period of from 2 to about 40 hours.

References Cited in the file of this patent

UNITED STATES PATENTS

| Number | Name | Date |
|---|---|---|
| 2,393,288 | Byrns | Jan. 22, 1946 |
| 2,437,532 | Huffman | Mar. 9, 1948 |
| 2,486,361 | Nahin et al. | Oct. 25, 1949 |
| 2,487,466 | Nahin | Nov. 8, 1949 |
| 2,500,146 | Fleck et al. | Mar. 14, 1950 |
| 2,547,380 | Fleck | Apr. 3, 1951 |
| 2,608,521 | Hoog | Aug. 26, 1952 |
| 2,608,534 | Fleck | Aug. 26, 1952 |